(12) United States Patent
Nooney et al.

(10) Patent No.: US 12,556,600 B2
(45) Date of Patent: *Feb. 17, 2026

(54) FRAGMENT SERVER DIRECTED DEVICE FRAGMENT CACHING

(71) Applicant: Adeia Media Holdings LLC, San Jose, CA (US)

(72) Inventors: Charles Nooney, Piedmont, CA (US); Kent Karlsson, Berkeley, CA (US)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,440

(22) Filed: Jun. 25, 2024

(65) Prior Publication Data

US 2025/0133127 A1  Apr. 24, 2025

Related U.S. Application Data

(63) Continuation of application No. 18/218,934, filed on Jul. 6, 2023, now Pat. No. 12,052,450, which is a
(Continued)

(51) Int. Cl.
*H04L 65/80* (2022.01)
*H04L 65/60* (2022.01)
(Continued)

(52) U.S. Cl.
CPC .............. *H04L 65/80* (2013.01); *H04L 65/60* (2013.01); *H04L 65/612* (2022.05);
(Continued)

(58) Field of Classification Search
CPC ....... H04L 65/60; H04L 65/612; H04L 65/80; H04L 67/568; H04L 67/5682;
(Continued)

(56) References Cited

U.S. PATENT DOCUMENTS 5,623,377 A * 4/1997 Behrens ................... G11B 5/09
5,907,678 A   5/1999 Housel et al.
(Continued)

OTHER PUBLICATIONS

"Int'l Application Serial No. PCT/US2012/054690, Preliminary Report on Patentability dated Mar. 27, 2014", 7 pgs.
(Continued)

*Primary Examiner* — Michael B. Pierorazio
(74) *Attorney, Agent, or Firm* — HG LAW LLP

(57) ABSTRACT

The media stream delivery system encodes and fragments media streams into numerous media stream fragments maintained on fragment servers. Devices obtain fragments to reconstruct media streams including live real-time media streams for playback on the devices. A device may perform caching of media stream fragments so that particular fragments need not be accessed again from a fragment server. A fragment server or even a content provider can analyze and monitor characteristics of media streams, viewing behavior, content popularity, etc., to identify fragments for caching at the playback devices. Caching indicators along with time period indicators may be included in the media stream fragments.

20 Claims, 8 Drawing Sheets

Related U.S. Application Data continuation of application No. 17/573,373, filed on Jan. 11, 2022, now Pat. No. 11,743,519, which is a continuation of application No. 16/043,080, filed on Jul. 23, 2018, now Pat. No. 11,252,453, which is a continuation of application No. 15/288,828, filed on Oct. 7, 2016, now Pat. No. 10,057,607, which is a continuation of application No. 14/022,166, filed on Sep. 9, 2013, now Pat. No. 9,491,213, which is a continuation of application No. 13/232,913, filed on Sep. 14, 2011, now Pat. No. 8,560,719.

(51) Int. Cl.

| | |
|---|---|
| *H04L 65/612* | (2022.01) |
| *H04L 67/568* | (2022.01) |
| *H04L 67/5682* | (2022.01) |
| *H04N 21/2187* | (2011.01) |
| *H04N 21/231* | (2011.01) |
| *H04N 21/234* | (2011.01) |
| *H04N 21/2343* | (2011.01) |
| *H04N 21/235* | (2011.01) |
| *H04N 21/2387* | (2011.01) |
| *H04N 21/239* | (2011.01) |
| *H04N 21/25* | (2011.01) |
| *H04N 21/433* | (2011.01) |
| *H04N 21/44* | (2011.01) |
| *H04N 21/6543* | (2011.01) |
| *H04N 21/845* | (2011.01) |
| *H04N 21/218* | (2011.01) |

(52) U.S. Cl.
CPC ........ *H04L 67/568* (2022.05); *H04L 67/5682* (2022.05); *H04N 21/2187* (2013.01); *H04N 21/23106* (2013.01); *H04N 21/234* (2013.01); *H04N 21/23418* (2013.01); *H04N 21/234309* (2013.01); *H04N 21/2353* (2013.01); *H04N 21/2387* (2013.01); *H04N 21/2393* (2013.01); *H04N 21/251* (2013.01); *H04N 21/4331* (2013.01); *H04N 21/44016* (2013.01); *H04N 21/6543* (2013.01); *H04N 21/8451* (2013.01); *H04N 21/2181* (2013.01)

(58) Field of Classification Search
CPC ........... H04N 21/2181; H04N 21/2187; H04N 21/23106; H04N 21/234; H04N 21/23418; H04N 21/234309; H04N 21/2353; H04N 21/2387; H04N 21/2393; H04N 21/251; H04N 21/4331; H04N 21/44016; H04N 21/6543; H04N 21/8451
See application file for complete search history.

(56) References Cited

U.S. PATENT DOCUMENTS

| | | | |
|---|---|---|---|
| 6,496,980 B1 | 12/2002 | Tillman et al. | |
| 6,725,335 B2 | 4/2004 | Bala et al. | |
| 7,719,540 B2* | 5/2010 | Piazza | G06T 15/005 |
| | | | 345/557 |
| 7,730,154 B2 | 6/2010 | Agarwalla et al. | |
| 7,822,119 B2* | 10/2010 | Boon | H04N 19/593 |
| | | | 375/240.12 |
| 7,830,959 B2* | 11/2010 | Park | H04N 19/423 |
| | | | 375/240.12 |
| 8,560,719 B2 | 10/2013 | Nooney et al. | |
| 9,491,213 B2 | 11/2016 | Nooney et al. | |
| 9,549,221 B2* | 1/2017 | Into | H04N 7/104 |
| 10,057,607 B2 | 8/2018 | Nooney et al. | |
| 11,252,453 B2 | 2/2022 | Nooney et al. | |
| 11,743,519 B2 | 8/2023 | Nooney et al. | |
| 12,052,450 B2 | 7/2024 | Nooney et al. | |
| 2003/0123557 A1* | 7/2003 | De With | H04N 19/60 |
| | | | 375/E7.242 |
| 2003/0159139 A1* | 8/2003 | Candelore | H04N 21/4347 |
| | | | 380/201 |
| 2004/0003178 A1* | 1/2004 | Magoshi | G06F 12/0875 |
| | | | 711/217 |
| 2004/0010613 A1 | 1/2004 | Apostolopoulos et al. | |
| 2004/0010614 A1* | 1/2004 | Mukherjee | H04N 21/2662 |
| | | | 348/E7.063 |
| 2004/0022543 A1* | 2/2004 | Hosking | H04B 10/0799 |
| | | | 398/135 |
| 2005/0044501 A1 | 2/2005 | Obata et al. | |
| 2005/0066063 A1 | 3/2005 | Grigorovitch et al. | |
| 2005/0219253 A1* | 10/2005 | Piazza | G06T 15/005 |
| | | | 345/557 |
| 2006/0085441 A1 | 4/2006 | Funk et al. | |
| 2006/0106867 A1 | 5/2006 | Burges et al. | |
| 2007/0055743 A1 | 3/2007 | Pirtle et al. | |
| 2007/0101370 A1* | 5/2007 | Calderwood | H04N 21/47214 |
| | | | 725/38 |
| 2008/0031329 A1* | 2/2008 | Iwata | H04N 19/593 |
| | | | 375/E7.176 |
| 2008/0094419 A1* | 4/2008 | Leigh | G09G 3/007 |
| | | | 382/300 |
| 2008/0123750 A1* | 5/2008 | Bronstein | H04N 19/436 |
| | | | 375/240.24 |
| 2008/0177994 A1 | 7/2008 | Mayer | |
| 2009/0094658 A1* | 4/2009 | Kobayashi | H04N 21/4325 |
| | | | 725/118 |
| 2009/0100459 A1* | 4/2009 | Riedl | H04N 21/2405 |
| | | | 725/35 |
| 2010/0091836 A1* | 4/2010 | Jia | H04N 19/86 |
| | | | 375/240.01 |
| 2010/0091880 A1* | 4/2010 | Jia | H04N 19/44 |
| | | | 375/240.25 |
| 2010/0097250 A1* | 4/2010 | Demircin | H04N 19/61 |
| | | | 341/107 |
| 2010/0098155 A1* | 4/2010 | Demircin | H03M 7/4006 |
| | | | 375/E7.126 |
| 2010/0118945 A1* | 5/2010 | Wada | H04N 19/70 |
| | | | 375/E7.246 |
| 2010/0128797 A1* | 5/2010 | Dey | H04N 19/61 |
| | | | 375/240.24 |
| 2010/0180011 A1 | 7/2010 | Sood et al. | |
| 2010/0195922 A1* | 8/2010 | Amano | H04N 19/176 |
| | | | 382/233 |
| 2010/0235528 A1 | 9/2010 | Bocharov et al. | |
| 2010/0246683 A1* | 9/2010 | Webb | H04N 19/895 |
| | | | 375/E7.123 |
| 2010/0260263 A1* | 10/2010 | Kotaka | H04N 19/154 |
| | | | 375/E7.243 |
| 2010/0271379 A1 | 10/2010 | Byford et al. | |
| 2010/0296744 A1* | 11/2010 | Boon | H04N 19/593 |
| | | | 382/233 |
| 2010/0321428 A1* | 12/2010 | Saito | G06K 15/102 |
| | | | 347/9 |
| 2011/0080940 A1 | 4/2011 | Bocharov et al. | |
| 2011/0102683 A1* | 5/2011 | Josephs | H04N 21/462 |
| | | | 725/39 |
| 2011/0134024 A1 | 6/2011 | Park | H04N 21/4363 |
| | | | 345/156 |
| 2011/0182523 A1* | 7/2011 | Kim | H04N 19/593 |
| | | | 382/233 |
| 2011/0246621 A1* | 10/2011 | May, Jr. | H04L 65/612 |
| | | | 709/219 |
| 2011/0246622 A1* | 10/2011 | Pantos | H04L 65/65 |
| | | | 709/219 |
| 2011/0299836 A1* | 12/2011 | Amsterdam | H04N 21/4335 |
| | | | 386/296 |
| 2011/0304773 A1* | 12/2011 | Okumura | G09G 3/2092 |
| | | | 348/607 |
| 2012/0007992 A1* | 1/2012 | Zhou | H04N 19/119 |
| | | | 348/E3.051 |
| 2013/0067036 A1 | 3/2013 | Nooney et al. | |
| 2013/0067108 A1 | 3/2013 | Nooney et al. | |

(56) References Cited

U.S. PATENT DOCUMENTS

| | | | |
|---|---|---|---|
| 2013/0208808 A1* | 8/2013 | Sasai | H04N 19/117 375/240.25 |
| 2013/0263201 A1* | 10/2013 | Chung-How | H04L 1/0026 725/116 |
| 2014/0012958 A1 | 1/2014 | Nooney et al. | |
| 2014/0119675 A1* | 5/2014 | Kim | G06T 3/40 382/299 |
| 2014/0125832 A1* | 5/2014 | Tanji | H04N 5/126 348/222.1 |
| 2014/0245370 A1* | 8/2014 | Ngo | H04N 7/17336 725/116 |
| 2014/0285483 A1* | 9/2014 | Yamanaka | G09G 5/393 345/419 |
| 2015/0003525 A1* | 1/2015 | Sasai | H04N 19/117 375/240.12 |
| 2015/0124888 A1* | 5/2015 | Hwang | H04N 21/6336 375/240.26 |
| 2015/0135247 A1* | 5/2015 | Kitazato | H04N 21/4305 725/110 |
| 2015/0156557 A1* | 6/2015 | Kang | H04N 21/26258 725/131 |
| 2015/0201178 A1* | 7/2015 | Lakshminarayanan | H04N 19/187 348/43 |
| 2015/0213776 A1* | 7/2015 | Sharma | G09G 5/005 345/520 |
| 2015/0281752 A1* | 10/2015 | Van Veldhuisen | H04N 21/233 725/116 |
| 2015/0326923 A1* | 11/2015 | Chung | H04N 21/81 725/110 |
| 2016/0191961 A1* | 6/2016 | Fisher | H04N 21/234309 725/116 |
| 2016/0316235 A1* | 10/2016 | Van Veldhuisen | H04N 21/2335 |
| 2017/0070756 A1 | 3/2017 | Nooney et al. | |
| 2018/0332315 A1 | 11/2018 | Nooney et al. | |
| 2022/0132180 A1 | 4/2022 | Nooney et al. | |
| 2024/0015343 A1 | 1/2024 | Nooney et al. | |

OTHER PUBLICATIONS

"U.S. Appl. No. 13/232,913, Notice of Allowance dated Jun. 10, 2013", 10 pgs.

"U.S. Appl. No. 14/022,166 Examiner Interview Summary dated Apr. 27, 2016", 3 pages.

"U.S. Appl. No. 14/022,166, Non Final Office Action dated Jan. 21, 2016", 6 pgs.

"U.S. Appl. No. 14/022,166, Notice of Allowance dated Jul. 7, 2016", 5 pages.

"U.S. Appl. No. 15/288,828, Examiner Interview Summary dated Apr. 10, 2018", 3 pages.

"U.S. Appl. No. 15/288,828, Non Final Office Action dated Nov. 8, 2017", 11 pages.

"U.S. Appl. No. 15/288,828, Notice of Allowance dated Apr. 23, 2018", 5 pages.

"U.S. Appl. No. 15/288,828, Notice of Allowance dated May 11, 2018", 5 pages.

Costas et al., "Controlled Caching of Dynamic WWWW Pages", DEXA 2002, LNCS 2453, University of Athens, 13 Pepartment of Informatics and Telecommunications, Retrieved from the Internet <http:/fhelios.mm.di.uoa.gr/-costas/papers-subm/webcache . pdf >, 2002, 10 pgs.

Dykes, Sandra G. , "Cooperative Web Caching Using Server-Directed Proxy Sharing", Ph.D Dissertation Proposal; Division of Computer Science, The University of Texas, San Antonio, TX 78249, Retrieved from the Internet , Apr. 28, 1998, 48 pgs.

International Search Report and Written Opinion received for PCT Patent Application No. PCT/US12/54690, mailed on Nov. 8, 2012, 7 pages.

\* cited by examiner

FRAGMENT SERVER DIRECTED DEVICE FRAGMENT CACHING

CROSS-REFERENCE TO RELATED APPLICATIONS

This application is a continuation of U.S. patent application Ser. No. 18/218,934, filed Jul. 6, 2023, which of is a continuation of U.S. patent application Ser. No. 17/573,373, filed Jan. 11, 2022, now U.S. Pat. No. 11,743,519, which is a continuation of U.S. patent application Ser. No. 16/043,080, filed Jul. 23, 2018, now U.S. Pat. No. 11,252,453, which is a continuation of U.S. patent application Ser. No. 15/288,828, filed Oct. 7, 2016, now U.S. Pat. No. 10,057,607, which is a continuation of U.S. patent application Ser. No. 14/022,166, filed Sep. 9, 2013, now U.S. Pat. No. 9,491,213, which is a continuation of U.S. patent application Ser. No. 13/232,913, filed Sep. 14, 2011, now U.S. Pat. No. 8,560,719, the disclosure of which are hereby incorporated by reference herein in their entireties.

TECHNICAL FIELD

The present disclosure relates to fragment server directed device fragment caching.

DESCRIPTION OF RELATED ART

Media streams typically involve encoding or re-encoding prior to transmission to devices and users associated with the devices. In many instances, media streams are encoded into a format such as H.264 (MPEG-4 Part 10). H.264 is a block oriented motion compensation based codec that is widely used in Blu-ray Discs and streaming Internet sources. H.264 encoding can be resource intensive, and specialized hardware is often used to accelerate encoding particularly at high quality levels. In many implementations, live stream encoding servers are configured with application specific hardware to receive one or more channels or media streams and encode the channels or media streams into particular formats. The encoding servers may have the capacity to perform real-time live encoding on up to half a dozen media streams simultaneously. Devices receive media streams and perform decoding for playback.

However, mechanisms for caching media streams for more efficient playback are limited. Consequently, the techniques and mechanisms of the present invention provide improved mechanisms for performing media stream caching.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
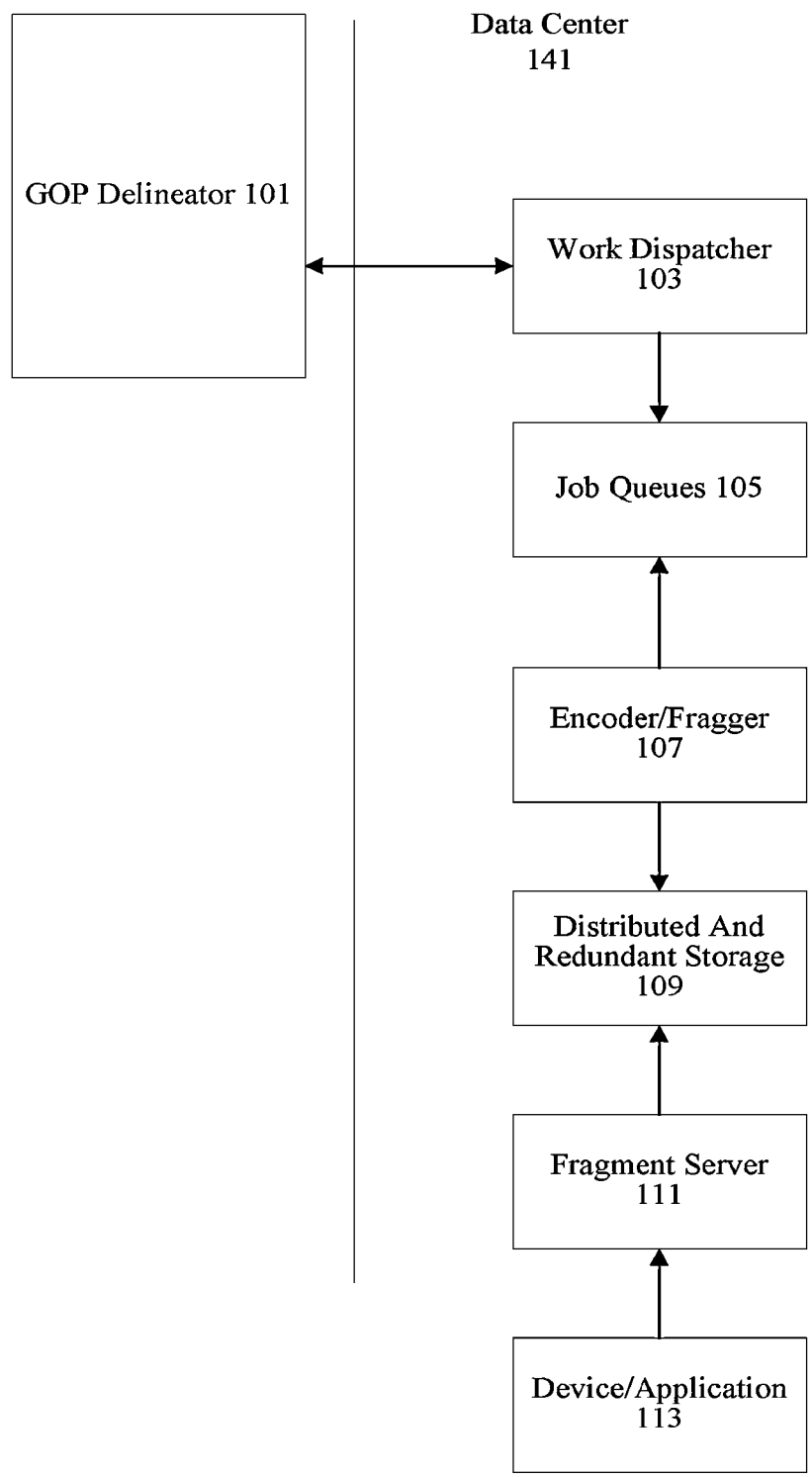
FIG. 1 illustrates one example of a distributed encoding system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragment servers. However, it should be noted that the techniques of the present invention may also apply to fragment server variations and media stream servers. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

The media stream delivery system encodes and fragments media streams into numerous media stream fragments maintained on fragment servers. Devices obtain fragments to reconstruct media streams including live real-time media streams for play back on the devices. A device may perform caching of media stream fragments so that particular fragments need not be accessed again from a fragment server. A fragment server or even a content provider can analyze and monitor characteristics of media streams, viewing behavior, content popularity, etc., to identify fragments for caching at the play back devices. Caching indicators along with time period indicators may be included in the media stream fragments.

EXAMPLE EMBODIMENTS

A variety of mechanisms are used to deliver media streams to devices. Different devices and different networks may require different variants of a media stream. Some devices may request a higher bit rate or higher resolution stream while changes in network conditions may necessitate switching to a stream having a lower quality level. Some devices may be able to handle higher resolutions, while others may have limited processing resources or limited screen real estate. Consequently, many systems will encode numerous variants of each media stream. For example, a media provider covering 152 channels may encode 8 variants of each channel for a total of 1216 variants. In some instances, a media provider may actually encode each channel into 8 variants of a particular codec, such as MPEG-4 part 10 or H.264.

Conventional MPEG-4 files require that a player on a device parse the entire header before any of the data can be decoded. Parsing the entire header can take a notable amount of time, particularly on devices with limited network and processing resources. Consequently, the techniques and mechanisms of the present invention provide a fragmented MPEG-4 framework that allows playback upon receiving a first MPEG-4 file fragment. A second MPEG-4 file fragment can be requested using information included in the first MPEG-4 file fragment. According to various embodiments, the second MPEG-4 file fragment requested may be a fragment corresponding to a higher or lower bit-rate stream than the stream associated with the first file fragment.

MPEG-4 is an extensible container format that does not have a fixed structure for describing media types. Instead, MPEG-4 has an object hierarchy that allows custom structures to be defined for each format. The format description is stored in the sample description ('stsd') box for each stream. The sample description box may include information that may not be known until all data has been encoded. For example, the sample description box may include an average bit rate that is not known prior to encoding.

According to various embodiments, MPEG-4 files are fragmented so that a live stream can be intelligent encoded in a distributed architecture on dynamically scalable hardware, recorded, and played back in a close to live manner. MPEG-4 files can be created without having to wait until all content is written to prepare the movie headers. To allow for MPEG-4 fragmentation without out of band signaling, a box structure is provided to include synchronization information, end of file information, and chapter information. According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

MPEG-4 fragments may be maintained on fragment servers. Devices request fragments from the fragment server in order to reconstruct particular media streams for playback. In some examples, fragments correspond to a particular live stream variant that is reconstructed as additional fragments are made available.

According to various embodiments, devices maintain fragments in a caching layer and check the caching layer before accessing a fragment server to obtain the fragment. Various network nodes between a fragment server and a device may also operate to cache particular fragments or even portions of fragments. Caching reduces latency required to obtain a particular fragment for play back and also reduces network resource consumption. Device caching schemes may include first in first out (FIFO) buffers that will maintain recent fragments for a particular period of time. However, many conventional caching algorithms do not work particularly well for media stream fragments. Consequently, the techniques of the present invention provide mechanisms for devices to recognize characteristics of a media stream and viewing characteristics of a user in order to more intelligently select fragments or portions of fragments for caching.

According to various embodiments, a device monitors and analyzes viewing characteristics of particular users as well as characteristics of media streams in order to identify fragments that may be requested more than once. The device may determine that particular fragments corresponding to introduction and end sequences for particular programs are repeatedly accessed by a particular user on a device. Fragments corresponding to those repeated introduction and end sequences may be maintained for extended periods of time in a caching layer that can be efficiently accessed during playback. In other examples, repeated sequences such as repeated program and advertisement sequences, etc., are automatically identified and maintained in a local caching layer.

According to various embodiments, a fragment server can also perform media stream and device characteristics monitoring and analysis. According to various embodiments, a fragment server has more information about what fragments are more frequently accessed or what fragments will be more frequently accessed. In particular embodiments, a fragment server knows that a particular advertisement sequence will be played a particular number of times over the next 24 hours and indicates to various devices that fragments corresponding to the advertisement sequence should be cached. In particular embodiments, flags and/or time period indicators may be included in individual fragments to indicate how long fragments should be maintained at device caching layers.

Request for fragments are exposed as separate files to clients and files should play on players that handle fragmented MPEG-4. Live or near live, video on demand (VOD), and digital video record (DVR) content can all be encoded on distributed and dynamically scalable encoding resources and fragmented for local caching and playback.

FIG. 1 illustrates one example of a system for performing distributed encoding, fragmentation, and caching. According to various embodiments, a media stream is received from a content provider source such as a satellite. In particular embodiments, the media stream is provided in an MPEG-2 format. The media stream is delineated into Groups of Pictures (GOPs) using a GOP delineator 101. The GOP is a group of pictures in coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bidirectionally predictive coded frames contain different information indicating distinctions from a reference frame such as a key frame or another predictive frame.

After the media stream is delineated into GOPs, a work dispatcher 103 is notified that a GOP is available. According to various embodiments, the work dispatcher 103 determines if it is the one assigned to work on it as well as what should be done with the GOP. According to various embodiments, the work dispatcher may determine that the GOP should be encoded into 8 different variants. In particular embodiments, the work dispatcher 103 creates a description of what needs to be done, assigns a weight or priority level to the job, and sends the job to job queues 105. According to various embodiments, job queues are first in first out (FIFO) queues that are empty most of the time. Encoders/fraggers 107 request jobs and obtain them from the job queues 105. According to various embodiments, jobs may be ordered in a job queue based on weight. In particular embodiments, encoders/fraggers 107 may select higher priority jobs first from the job queues.

In particular embodiments, different priority jobs are placed in different priority job queues. Multiple jobs may be taken from the higher priority job queues before a single job is taken from the lower priority job queues. According to various embodiments, highest priority jobs are processed before lower priority jobs. In particular embodiments, queues are assigned percentage of service values. A high priority queue may get serviced 40% of the time. A medium priority queue 30% of the time, and the remaining queues 20% and 10% of the time by the encoders/fraggers. According to various embodiments, hundreds or thousands of encoders/fraggers reside in a system. In particular embodiments, the same device performs both encoding and fragmentation, but it should be noted that separated devices can be used to perform these operations. According to various embodiments, additional encoder/fraggers can be dynamically brought online when resource usage reaches a particular threshold. Alternatively, encoder/fraggers can be taken offline when resources usage falls beneath a particular floor. According to various embodiments, encoder/fragger 107 is a virtual machine that may reside on one or more physical servers that may or may not have specialized encoding hardware. In particular embodiments, a cloud service determines how many of these virtual machines to use based on established thresholds.

According to various embodiments, a unique identifier is provided for each GOP and a log of each step is maintained. After the encoder/fragger 107 completes processing a job and outputs an encoded fragment, the encoded fragment is maintained in distributed and redundant storage 109. In one example, distributed and redundant storage 109 is a virtualized scale out network attached storage system. The distributed and redundant storage 109 allows a system to maintain numerous fragments on any number of virtualized storage devices.

According to various embodiments, fragments on distributed and redundant storage 109 are accessible by fragment server 111. The fragment server 111 provides the caching layer with fragments for clients. The design philosophy behind the client/server API minimizes round trips and reduces complexity as much as possible when it comes to delivery of the media data to a client device. The fragment server 111 provides live streams and/or DVR configurations.

According to various embodiments, a client device uses a media component that requests fragmented MPEG-4 files, allows trick-play, and manages bandwidth adaptation. In particular embodiments, each client device receives a media stream that is behind a live stream by 12 seconds or more. There may also be server buffering. According to various embodiments, GOP delineation, encoding, fragmentation can occur within a server buffering timeframe. By having numerous encoder/fraggers, capacity can be increased or decreased by percentage points at any time. According to various embodiments, the encoding and fragmentation system at data center 141 can be accessed by devices during media stream playback. Device 113 may request fragments from fragment server 111. In particular embodiments, the device may perform local caching. It should be noted that a variety of nodes may reside between a device 113 and a fragment server 111.

Figure 2:
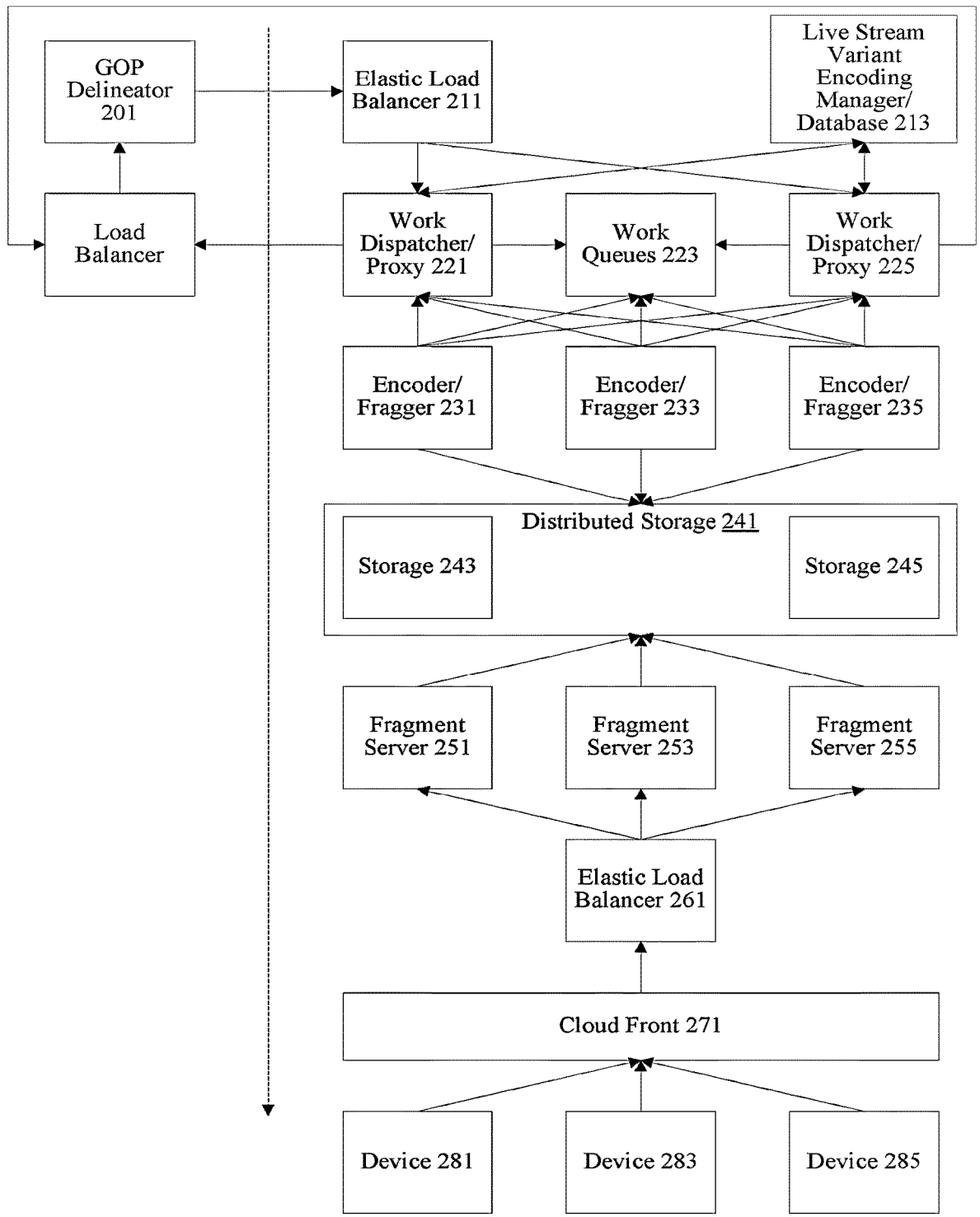
FIG. 2 illustrates one example of a mechanism for implementing distributed encoding redundancy with live stream variant monitoring.

FIG. 2 illustrates one example of a distributed, scalable encoding system that provides for localized redundancy. According to various embodiments, a media stream is received from a content provider source such as a satellite. In particular embodiments, the media stream is provided in an MPEG-2 format. The media stream is delineated into Groups of Pictures (GOPs) using a GOP delineator 201. The GOP is a group of pictures in coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bidirectionally predictive coded frames contain different information indicating distinctions from a reference frame such as a key frame or another predictive frame. According to various embodiments, multiple GOP delineators 201 are active simultaneously. If a GOP delineator fails, other GOP delineators are available and all GOP delineators can send out notifications.

After the media stream is delineated into GOPs, an elastic load balancer 211 is used to distribute work to work dispatchers 221 and 225. According to various embodiments, a live stream variant encoding manager 213 monitors live stream variant consumption. If particular variant are not being consumed, jobs for creating those variants are no longer performed. If particular not yet available variants are requested, then jobs creating those variants can be generated by the work dispatcher 225 at the request of the live stream variant encoding manager 213. If a work dispatcher fails right as it takes a notification, another notification occurs to a different work dispatcher. Two notifications for the same GOP will end up on two different machines. At each work dispatcher 221 and 225, there may also be a proxy. According to various embodiments, the GOP delineator 201 resides on a different data center than the work dispatchers 221 and 225. Using proxies at work dispatchers 221 and 225 allows for a single transfer of a media stream GOP between data centers.

According to various embodiments, the work dispatchers 221 and 225 determine characteristics of a particular job and what should be done with the GOP. According to various embodiments, the work dispatchers 221 and 225 may determine that the GOP should be encoded into 8 different variants. In particular embodiments, the work dispatchers 221 and 225 create descriptions of what needs to be done and send jobs to job queues 223. According to various embodiments, job queues 223 include an active job queue and a standby job queue. According to various embodiments, job queues are first in first out (FIFO) queues that are empty most of the time. Timeouts may be associated with each job in the queue. Encoders/fraggers 231, 233, and 235 request jobs and obtain them from the job queues 223. In particular embodiments, encoders/fraggers 231, 233, and 235 are identical and can be dynamically activated or deactivated. According to various embodiments, hundreds or thousands of encoders/fraggers reside in a system.

In particular embodiments, the same device performs both encoding and fragmentation, but it should be noted that separated devices can be used to perform these operations. According to various embodiments, additional encoder/fraggers can be dynamically brought online when resource usage reaches a particular threshold. Alternatively, encoder/fraggers can be taken offline when resources usage falls beneath a particular floor. According to various embodiments, encoder/fragger 231, 233, and 235 is a virtual machine that may reside on one or more physical servers that may or may not have specialized encoding hardware. In particular embodiments, a cloud service determines how many of these virtual machines to use based on established thresholds.

According to various embodiments, encoders/fraggers 231, 233, and 235 are stateless. According to various embodiments, a unique identifier is provided for each GOP and a log of each step is maintained. If a particular encoder/fragger fails at any point in the process, another encoder/fragger can perform encoding and fragmentation operations. After the encoders/fraggers 231, 233, and 235 complete the jobs and generate encoded fragments, the encoded fragments are maintained in distributed and redundant storage 241. In one example, distributed and redundant storage 241 is a virtualized scale out network attached storage system. The distributed and redundant storage 241 includes nodes 243 and 245, allowing a system to maintain numerous fragments on any number of virtualized storage devices.

According to various embodiments, fragments on distributed and redundant storage 241 are accessible by fragment servers 251, 253, and 255. The fragment servers 251, 253, and 255 provide a caching layer with fragments for clients. The design philosophy behind the client/server API minimizes round trips and reduces complexity as much as possible when it comes to delivery of the media data to a client device. The fragment servers 251, 253, and 255 provide live streams and/or DVR configurations. According to various embodiments, fragment servers also operate without state. In particular embodiments, fragments servers operate using HTTP get requests. According to various embodiments, each process allows a flow to continue without having a centralized control point. An elastic load balancer 261 distributes fragment requests from a cloud front 271 provided to devices 281, 283, and 285. According to various embodiments, devices 281, 283, and 285 monitor and analyze media streams to determine what fragments should be cached. In some examples, devices 281, 283, and 285 cache any fragment that has been determined to be redundant to any fragment previously requested. Fragments can be compared using identifiers, hashes, etc.

It is determined that if the same fragment has been obtained at least twice, it is likely that the fragment will need to be accessed again. In particular embodiments, the device identifies sequences corresponding to advertisements, program introductions, program endings, etc., and caches fragments associated with those identified sequences. Particular advertisements, introductions, and endings, etc., may be more likely repeated. If a viewer is identified as frequently watching a particular program, fragments associated with introduction sequences, ending sequences, and advertisements for that program may be cached.

According to various embodiments, a client device uses a media component that requests fragmented MPEG-4 files, allows trick-play, and manages bandwidth adaptation. In particular embodiments, each client device receives a media stream that is behind a live stream by 12 seconds or more. Caching can reduce delay and/or network resource usage. According to various embodiments, GOP delineation, encoding, fragmentation can occur within a server buffering timeframe. By having numerous encoder/fraggers, capacity can be increased or decreased by percentage points at any time. According to various embodiments, a system provides not only localized redundancy but geographic redundancy as well. A complete system including load balancers, work dispatchers, encoders/fraggers, storage, fragment servers, etc., may be replicated at a geographically separate data center.

Figure 3:
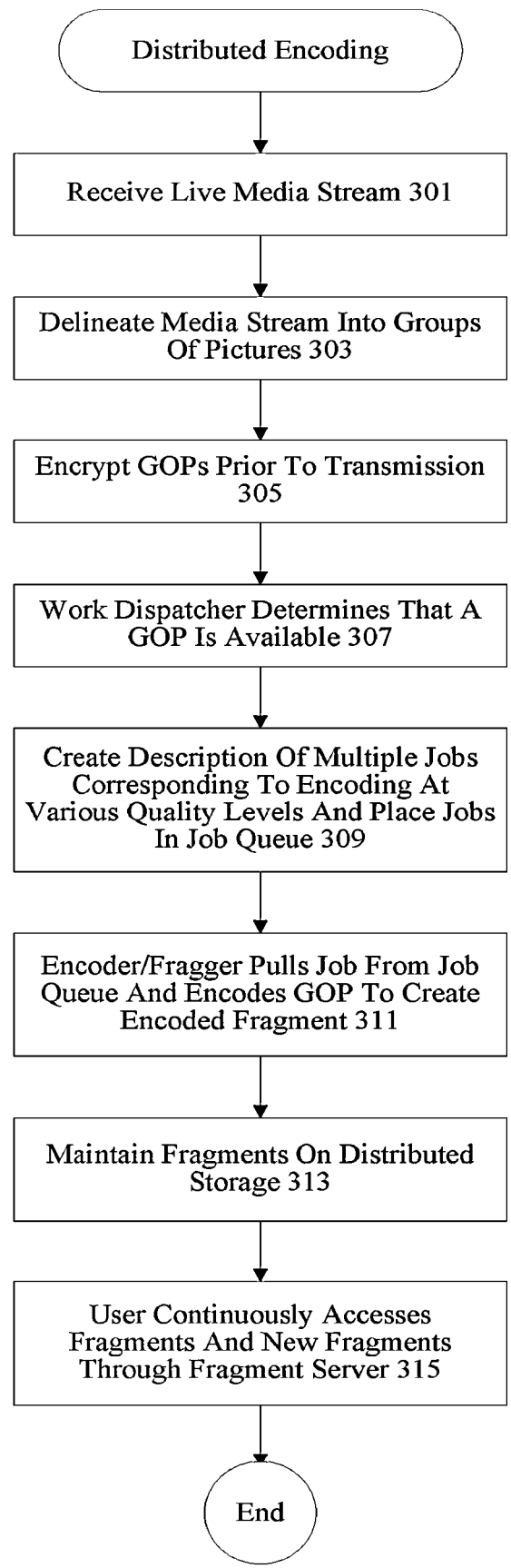
FIG. 3 illustrates a technique for performing distributing encoding and fragmentation.

FIG. 3 illustrates one example of a technique for performing distributed encoding. At 301, a live media stream is received. According to various embodiments, the media stream is a live MPEG-2 media stream received from a satellite receiver. In particular embodiments, a live media stream refers to a media program received at a particular time that is designated for distribution at that particular time. For example, a program may be configured to run at 8 pm PST, and the live media stream is received at the satellite receiver at 8 pm PST. At 303, the media stream is delineated into GOPs. In particular embodiments, key frames are identified and used to begin groups of pictures. The GOPs may be optionally encrypted at this point before transmission at 305.

At 307, a work dispatcher determines that a GOP is available. According to various embodiments, the GOP delineator and the work dispatcher reside in different data centers and it is desirable to have a single GOP transfer instead of redundant GOP transfers. At 309, the work dispatcher creates descriptions of multiple jobs corresponding to different encoding quality levels and places the jobs in work queues. According to various embodiments, the jobs are assigned different weights and/or priority levels. An encoder/fragger at 311 pulls the job from the job queue and encodes the GOP into a format such as H.264. Encoded fragments are maintained on distributed storage at 313. A user can then continuously access the encoded fragments at a particular quality level through a fragment server at 315 that allows real-time or near real-time Internet Protocol (IP) distribution of the media stream fragments.

Figure 4:
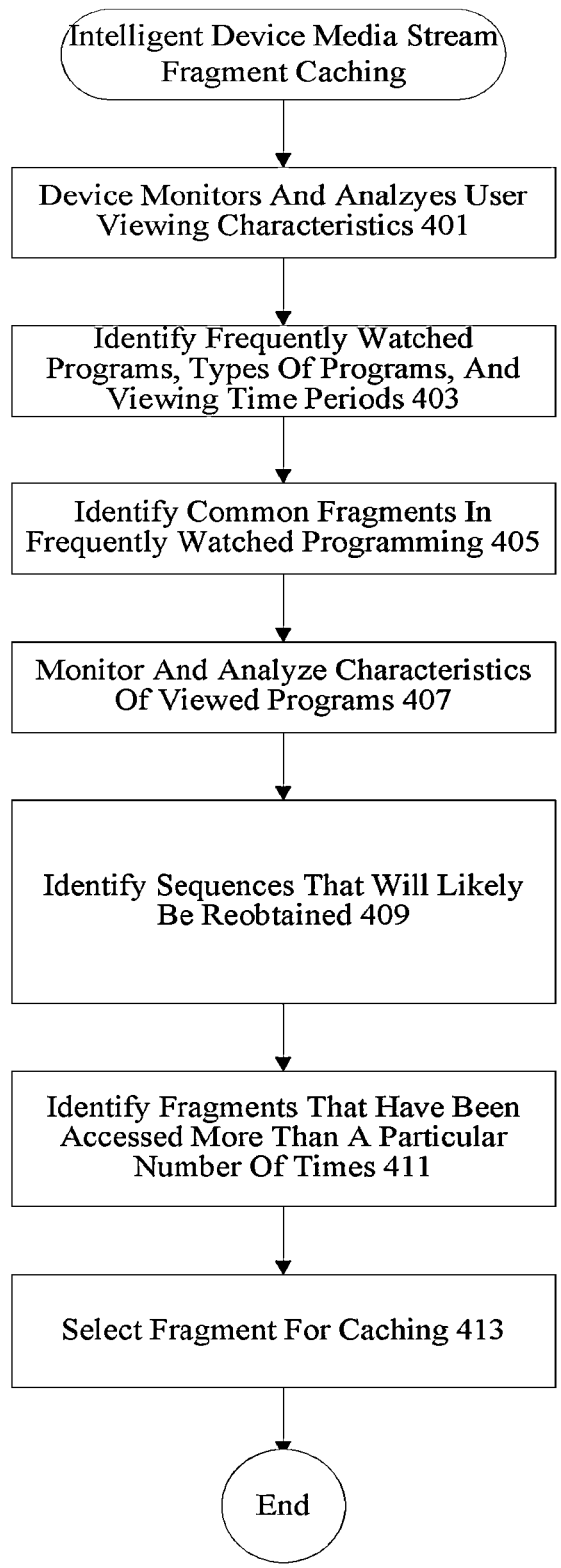
FIG. 4 illustrates a technique for performing intelligent device media stream fragment caching.

FIG. 4 illustrates a particular example of a technique for performing device caching. At 401, a device monitors and analyzes user viewing characteristics. The device may determine at 403 that a user watches particular programs, particular channels, particular types of programs, or watches at particular times. Fragments that frequently occur during those particular programs, particular channels, particular types of programs, or particular time periods may be identified for caching at 405. At 407, characteristics of viewed programs are monitored and analyzed. Repeated sequences such as introductions, advertisements, endings, etc., are identified as candidates for local caching. Other sequences that are repeated may also be identified for caching at 409. In particular embodiments, fragments have associated identifiers, checksums, or hash codes that allow quick comparison to determine fragment identity. In one example, a fragment table is maintained showing fragment identifiers, access frequencies, and last accessed timestamps. When a fragment has been accessed more than a particular number of times at 411, that fragment may be selected for caching at 413.

Figure 5:
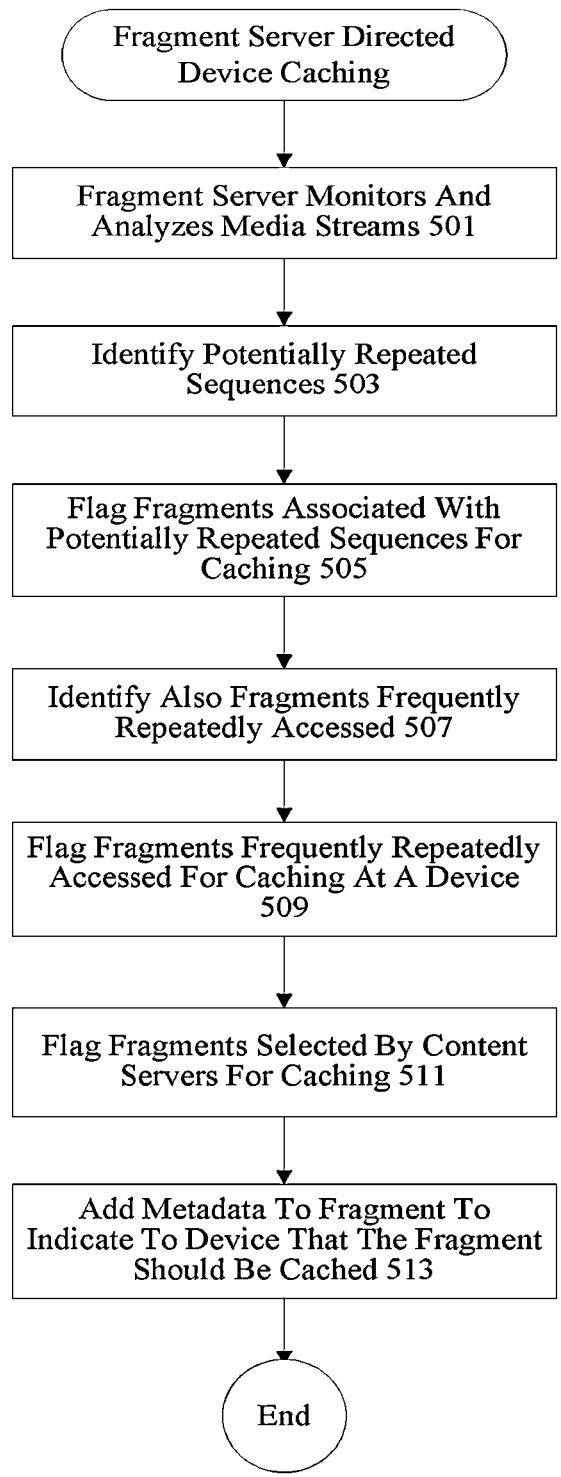
FIG. 5 illustrates another technique for performing server directed fragment caching.

FIG. 5 illustrates one example of a technique for fragment server directed device fragment caching. At 501, a fragment server monitors and analyzes media streams to identify fragments appropriate for device caching. According to various embodiments, the fragment server knows that a particular sequence such as a promotion sequence will be played a particular number of times during the next 72 hours at 503 and identifies fragments associated with that sequence for caching at 505. In particular embodiments, the fragment server also identifies fragments most frequently repeatedly accessed by a particular device, a subgroup of devices, or all devices that can connect to the fragment server at 507. These frequently accessed fragments are selected for caching at 509. In some examples, content providers may also indicate to a fragment server what fragments to cache at 511.

At 513, the fragment server includes metadata such as a flag and/or a time period during which a particular fragment should be cached at a device. The metadata may be included in the fragment itself or may be included out of band.

Figure 6:
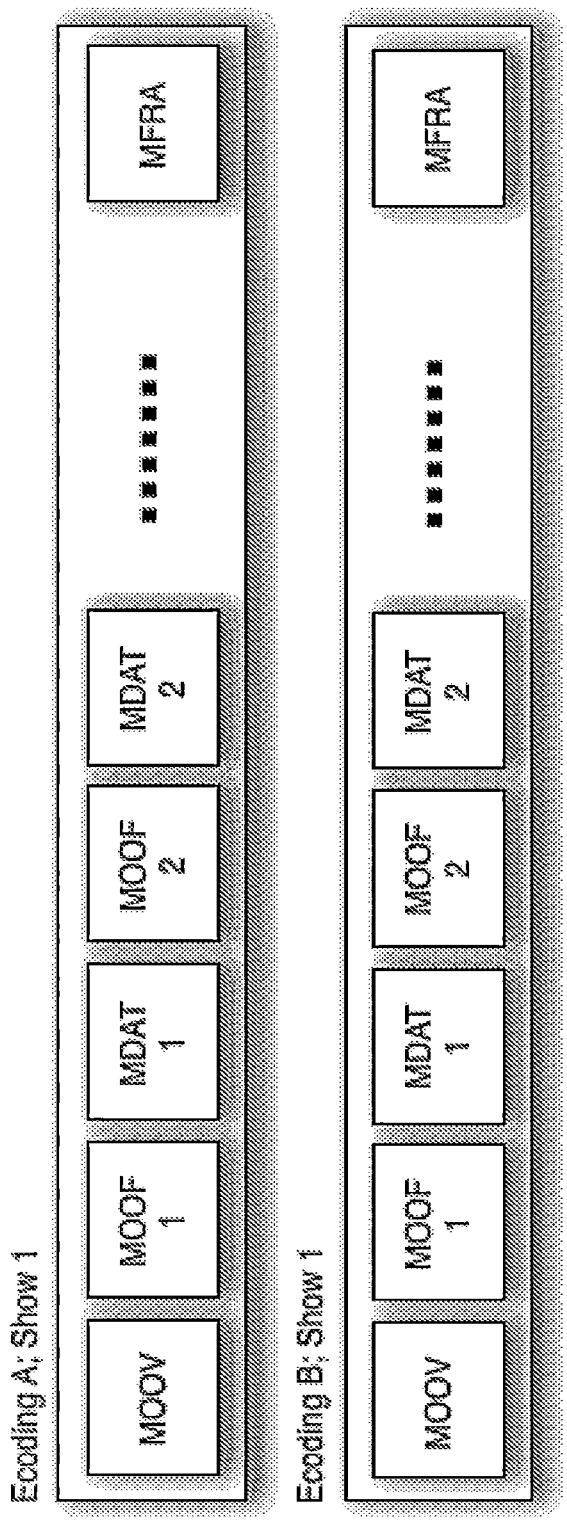
FIG. 6 illustrates examples of files stored by a fragment writer.

FIG. 6 illustrates examples of files stored by the fragment writer associated with a fragment server. According to various embodiments, the fragment writer is a component in the overall fragmenter. It is a binary that uses command line arguments to record a particular program based on either NTP time from the encoded stream or wallclock time. In particular embodiments, this is configurable as part of the arguments and depends on the input stream. When the fragment writer completes recording a program it exits. For live streams, programs are artificially created to be short time intervals e.g. 5-15 minutes in length.

According to various embodiments, the fragment writer command line arguments are the SDP file of the channel to record, the start time, end time, name of the current and next output files. The fragment writer listens to RTP traffic from the live video encoders and rewrites the media data to disk as fragmented MPEG-4. According to various embodiments, media data is written as fragmented MPEG-4 as defined in MPEG-4 part 12 (ISO/IEC 14496-12). Each broadcast show is written to disk as a separate file indicated by the show ID (derived from EPG). Clients include the show ID as part of the channel name when requesting to view a prerecorded show. The fragment writer consumes each of the different encodings and stores them as a different MPEG-4 fragment.

In particular embodiments, the fragment writer writes the RTP data for a particular encoding and the show ID field to a single file. Inside that file, there is metadata information that describes the entire file (MOOV blocks). Atoms are stored as groups of MOOF/MDAT pairs to allow a show to be saved as a single file. At the end of the file there is random access information that can be used to enable a client to perform bandwidth adaptation and trick play functionality.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

The fragment server responds to HTTP requests for content. According to various embodiments, it provides APIs that can be used by clients to get necessary headers required to decode the video, seek to any desired time frame within the fragment and APIs to watch channels live. Effectively, live channels are served from the most recently written fragments for the show on that channel. The fragment server returns the media header (necessary for initializing decoders), particular fragments, and the random access block to clients. According to various embodiments, the APIs supported allow for optimization where the metadata header information is returned to the client along with the first fragment. The fragment writer creates a series of fragments within the file. When a client requests a stream, it makes requests for each of these fragments and the fragment server reads the portion of the file pertaining to that fragment and returns it to the client.

According to various embodiments, the fragment server uses a REST API that is cache friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

In particular embodiments, client requests for fragments follow the following format: http://{HOSTNAME}/frag/{CHANNEL}/{BITRATE}/[{ID}/] {COMMAND}[/{ARG}] e.g. http://frag.hosttv.com/frag/1/H8QVGAH264/1270059632.mp4/fragment/42. According to various embodiments, the channel name will be the same as the backend-channel name that is used as the channel portion of the SDP file. VOD uses a channel name of "vod". The BITRATE should follow the BITRATE/RESOLUTION identifier scheme used for RTP streams. The ID is dynamically assigned. For live streams, this may be the UNIX timestamp; for DVR this will be a unique ID for the show; for VOD this will be the asset ID. The ID is optional and not included in LIVE command requests. The command and argument are used to indicate the exact command desired and any arguments. For example, to request chunk 42 this portion would be "fragment/42".

The URL format makes the requests content delivery network (CDN) friendly because the fragments will never change after this point so two separate clients watching the same stream can be serviced using a cache. In particular, the headend architecture leverages this to avoid too many dynamic requests arriving at the Fragment Server by using an HTTP proxy at the head end to cache requests.

According to various embodiments, the fragment controller is a daemon that runs on the fragmenter and manages the fragment writer processes. We propose that it uses a configured filter that is executed by the Fragment Controller to generate the list of broadcasts to be recorded. This filter integrates with external components such as a guide server to determine which shows to record and the broadcast ID to use.

According to various embodiments, the client includes an application logic component and a media rendering component. The application logic component presents the UI for the user and also communicates to the front-end server to get shows that are available for the user and to authenticate. As part of this process, the server returns URLs to media assets that are passed to the media rendering component.

In particular embodiments, the client relies on the fact that each fragment in a fragmented MPEG-4 file has a sequence number. Using this knowledge and a well defined URL structure for communicating with the server, the client requests fragments individually as if it was reading separate files from the server simply by requesting URLs for files associated with increasing sequence numbers. In some embodiments, the client can request files corresponding to higher or lower bit rate streams depending on device and network resources.

Since each file contains the information needed to create the URL for the next file, no special playlist files are needed, and all actions (startup, channel change, seeking) can be performed with a single HTTP request. After each fragment is downloaded the client assesses among other things the size of the fragment and the time needed to download it in order to determine if downshifting is needed, or if there is enough bandwidth available to request a higher bitrate.

Because each request to the server looks like a request to a separate file, the response to requests can be cached in any HTTP Proxy, or be distributed over any HTTP based CDN.

Figure 7:
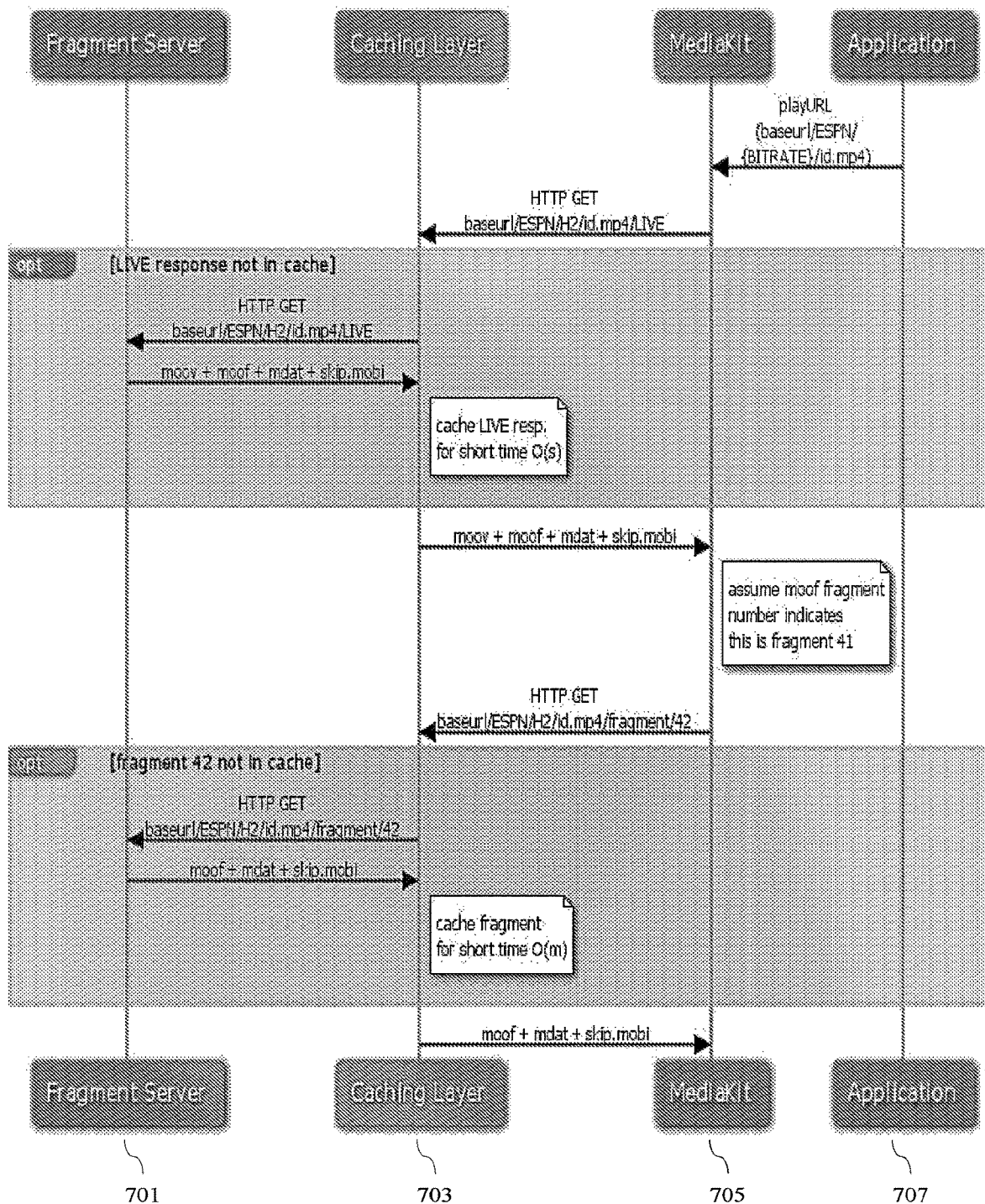
FIG. 7 illustrates one example of an exchange used with a fragmentation system.

FIG. 7 illustrates an interaction for a client receiving a live stream. The client starts playback when fragment plays out from the server. The client uses the fragment number so that it can request the appropriate subsequence file fragment. An application such as a player application 707 sends a request to mediakit 705. The request may include a base address and bit rate. The mediakit 705 sends an HTTP get request to caching layer 703. According to various embodiments, the live response is not in cache, and the caching layer 703 forward the HTTP get request to a fragment server 701. The fragment server 701 performs processing and sends the appropriate fragment to the caching layer 703 which forwards to the data to mediakit 705.

The fragment may be cached for a short period of time at caching layer 703. The mediakit 705 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 705 may request a next fragment having a different data rate. In some instances, the mediakit 705 may request a next fragment having a higher data rate. According to various embodiments, the fragment server 701 maintains fragments for different quality of service streams with timing synchronization information to allow for timing accurate playback.

The mediakit 705 requests a next fragment using information from the received fragment. According to various embodiments, the next fragment for the media stream may be maintained on a different server, may have a different bit rate, or may require different authorization. Caching layer 703 determines that the next fragment is not in cache and forwards the request to fragment server 701. The fragment server 701 sends the fragment to caching layer 703 and the fragment is cached for a short period of time. The fragment is then sent to mediakit 705.

Figure 8:
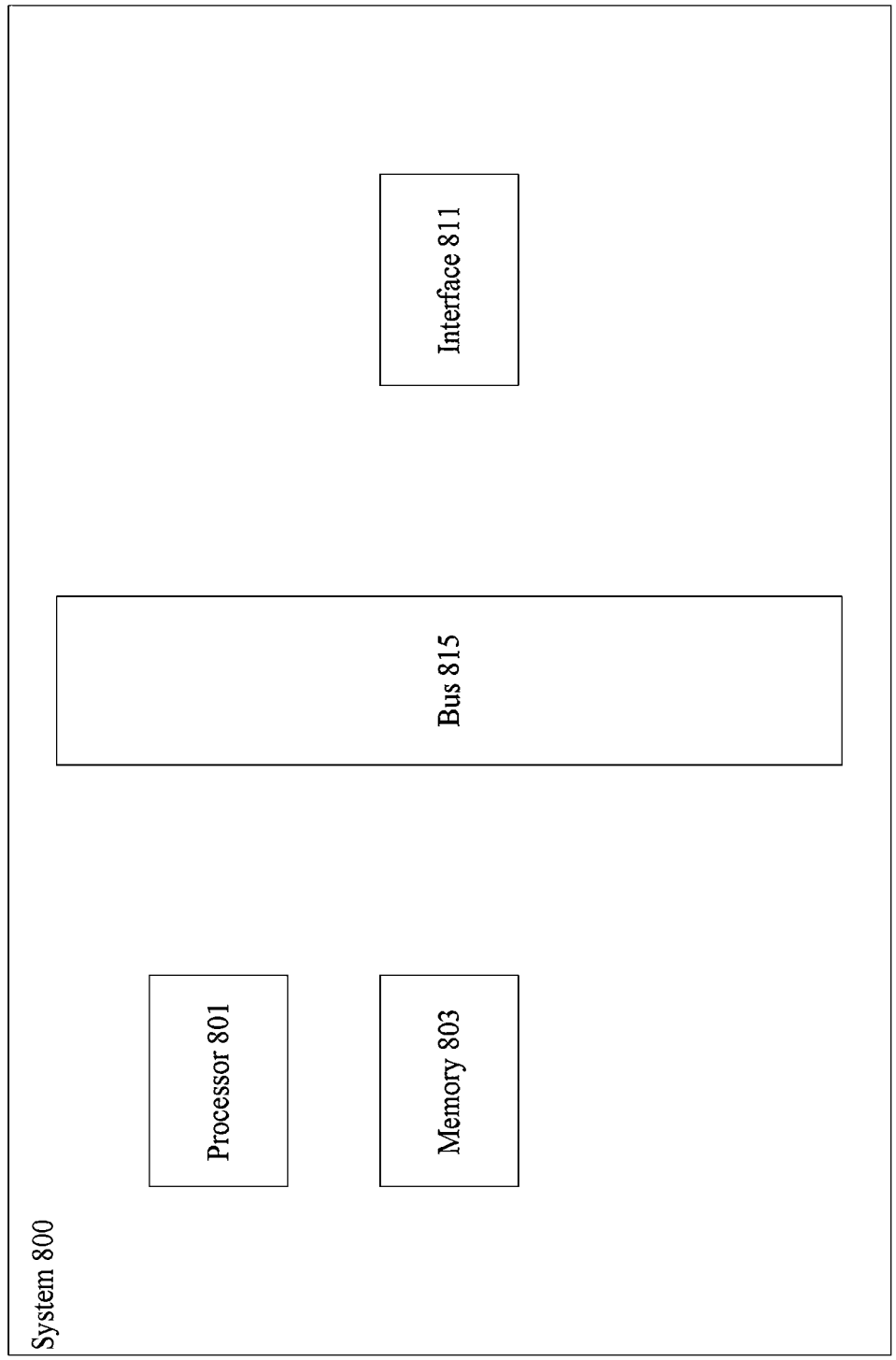
FIG. 8 illustrates one example of a system.

FIG. 8 illustrates one example of a computer system. According to particular embodiments, a system 800 suitable for implementing particular embodiments of the present invention includes a processor 801, a memory 803, an interface 811, and a bus 815 (e.g., a PCI bus or other interconnection fabric) and operates as a streaming server. When acting under the control of appropriate software or firmware, the processor 801 is responsible for modifying and transmitting live media data to a client. Various specially configured devices can also be used in place of a processor 801 or in addition to processor 801. The interface 811 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 800 is a fragment server that also includes a transceiver, streaming buffers, and a program guide database. The fragment server may also be associated with subscription management, logging and report generation, and monitoring capabilities.

In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server handles requests and responses for media content related transactions while a separate streaming server provides the actual media streams.

Although a particular fragment server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
   monitoring device characteristics of a device;
   receiving, from the device, a request for one or more media stream fragments of a plurality of media stream fragments, wherein the plurality of media stream fragments is associated with a plurality of variants;
   identifying a variant from the plurality of variants that is compatible with the device characteristics;
   identifying at least one fragment of the one or more media stream fragments to maintain in a local cache of the device;
   determining, based on the device characteristics, a length of time for maintaining the at least one fragment in the local cache of the device;
   adding an indicator in the at least one fragment, wherein the indicator indicates the length of time for maintaining the at least one fragment in the local cache of the device; and
   transmitting, to the device, the one or more media stream fragments of the plurality of media stream fragments, wherein the one or more media stream fragments is associated with the identified variant.

2. The method of claim 1, wherein the device characteristics include at least one of resolution capabilities, availability of processing resources, availability of storage, or availability of screen space.

3. The method of claim 1, further comprising:
   determining, based on the device characteristics, that the transmitted one or more media stream fragments will remain unreceived by the device after a certain amount of time; and
   based on the determining that the transmitted one or more media stream fragments will remain unreceived by the device after the certain amount of time, transmitting, to the device, a second media stream fragment of the plurality of media stream fragments, wherein the second media stream fragment is associated with a second variant of the plurality of variants different from the identified variant.

4. The method of claim 1, further comprising:
determining, based on the device characteristics, that decoding the one or more media stream fragments by the device is incomplete after a certain period of time; and
based on the determining that decoding the one or more media stream fragments by the device is incomplete after the certain period of time, transmitting, to the device, a second media stream fragment of the plurality of media stream fragments, wherein the second media stream fragment is associated with a second variant of the plurality of variants different from the identified variant.

5. The method of claim 1, wherein the at least one fragment to maintain in the local cache of the device is identified further based on determining that the at least one fragment has been previously accessed by the device at least once.

6. The method of claim 1, wherein each media stream fragment of the plurality of media stream fragments is an H.264 encoded fragment processed using a plurality of distributed and dynamically scalable encoder resources.

7. The method of claim 6, wherein the plurality of distributed and dynamically scalable encoder resources is a plurality of virtual machines configured to perform encoding and fragmentation.

8. The method of claim 6, wherein each H.264 encoded fragment is encoded from an MPEG-2 group of pictures (GOP).

9. A system comprising:
control circuitry configured to:
monitor device characteristics of a device;
input/output circuitry configured to:
receive, from the device, a request for one or more media stream fragments of a plurality of media stream fragments, wherein the plurality of media stream fragments is associated with a plurality of variants; and
wherein the control circuitry is further configured to:
identify a variant from the plurality of variants that is compatible with the device characteristics;
identify at least one fragment of the one or more media stream fragments to maintain in a local cache of the device;
determine, based on the device characteristics, a length of time for maintaining the at least one fragment in the local cache of the device;
add an indicator in the at least one fragment, wherein the indicator indicates the length of time for maintaining the at least one fragment in the local cache of the device; and
transmit, to the device, the one or more media stream fragments of the plurality of media stream fragments, wherein the one or more media stream fragments is associated with the identified variant.

10. The system of claim 9, wherein the device characteristics include at least one of resolution capabilities, availability of processing resources, availability of storage, or availability of screen space.

11. The system of claim 9, wherein the control circuitry is further configured to:

determine, based on the device characteristics, that the transmitted one or more media stream fragments will remain unreceived by the device after a certain amount of time; and
based on the determining that the transmitted one or more media stream fragments will remain unreceived by the device after the certain amount of time, transmit, to the device, a second media stream fragment of the plurality of media stream fragments, wherein the second media stream fragment is associated with a second variant of the plurality of variants different from the identified variant.

12. The system of claim 9, wherein the control circuitry is further configured to:
determine, based on the device characteristics, that decoding the one or more media stream fragments by the device is incomplete after a certain period of time; and
based on the determining that decoding the one or more media stream fragments by the device is incomplete after the certain period of time, transmit, to the device, a second media stream fragment of the plurality of media stream fragments, wherein the second media stream fragment is associated with a second variant of the plurality of variants different from the identified variant.

13. The system of claim 9, wherein the at least one fragment to maintain in the local cache of the device is identified further based on determining that the at least one fragment has been previously accessed by the device at least once.

14. The system of claim 9, wherein each media stream fragment of the plurality of media stream fragments is an H.264 encoded fragment processed using a plurality of distributed and dynamically scalable encoder resources.

15. The system of claim 14, wherein the plurality of distributed and dynamically scalable encoder resources is a plurality of virtual machines configured to perform encoding and fragmentation.

16. The system of claim 14, wherein each H.264 encoded fragment is encoded from an MPEG-2 group of pictures (GOP).

17. A non-transitory computer-readable medium having instructions encoded thereon that, when executed by control circuitry, cause the control circuitry to:
monitor device characteristics of a device;
receive, from the device, a request for one or more media stream fragments of a plurality of media stream fragments, wherein the plurality of media stream fragments is associated with a plurality of variants;
identify a variant from the plurality of variants that is compatible with the device characteristics;
identify at least one fragment of the one or more media stream fragments to maintain in a local cache of the device;
determine, based on the device characteristics, a length of time for maintaining the at least one fragment in the local cache of the device;
add an indicator in the at least one fragment, wherein the indicator indicates the length of time for maintaining the at least one fragment in the local cache of the device; and
transmit, to the device, the one or more media stream fragments of the plurality of media stream fragments, wherein the one or more media stream fragments is associated with the identified variant.

18. The non-transitory computer-readable medium of claim 17, wherein the device characteristics include at least one of resolution capabilities, availability of processing resources, availability of storage, or availability of screen space.

19. The non-transitory computer-readable medium of claim 17, wherein execution of the instructions further causes the control circuitry to:
   determine, based on the device characteristics, that the transmitted one or more media stream fragments will remain unreceived by the device after a certain amount of time; and
   based on the determining that the transmitted one or more media stream fragments will remain unreceived by the device after the certain amount of time, transmit, to the device, a second media stream fragment of the plurality of media stream fragments, wherein the second media stream fragment is associated with a second variant of the plurality of variants different from the identified variant.

20. The non-transitory computer-readable medium of claim 17, wherein execution of the instructions further causes the control circuitry to:
   determine, based on the device characteristics, that decoding the one or more media stream fragments by the device is incomplete after a certain period of time; and
   based on the determining that decoding the one or more media stream fragments by the device is incomplete after the certain period of time, transmit, to the device, a second media stream fragment of the plurality of media stream fragments, wherein the second media stream fragment is associated with a second variant of the plurality of variants different from the identified variant.

* * * * *